M. HAYDEN.
Grain Drill.
No. 100,033.
Patented Feb. 22, 1870.
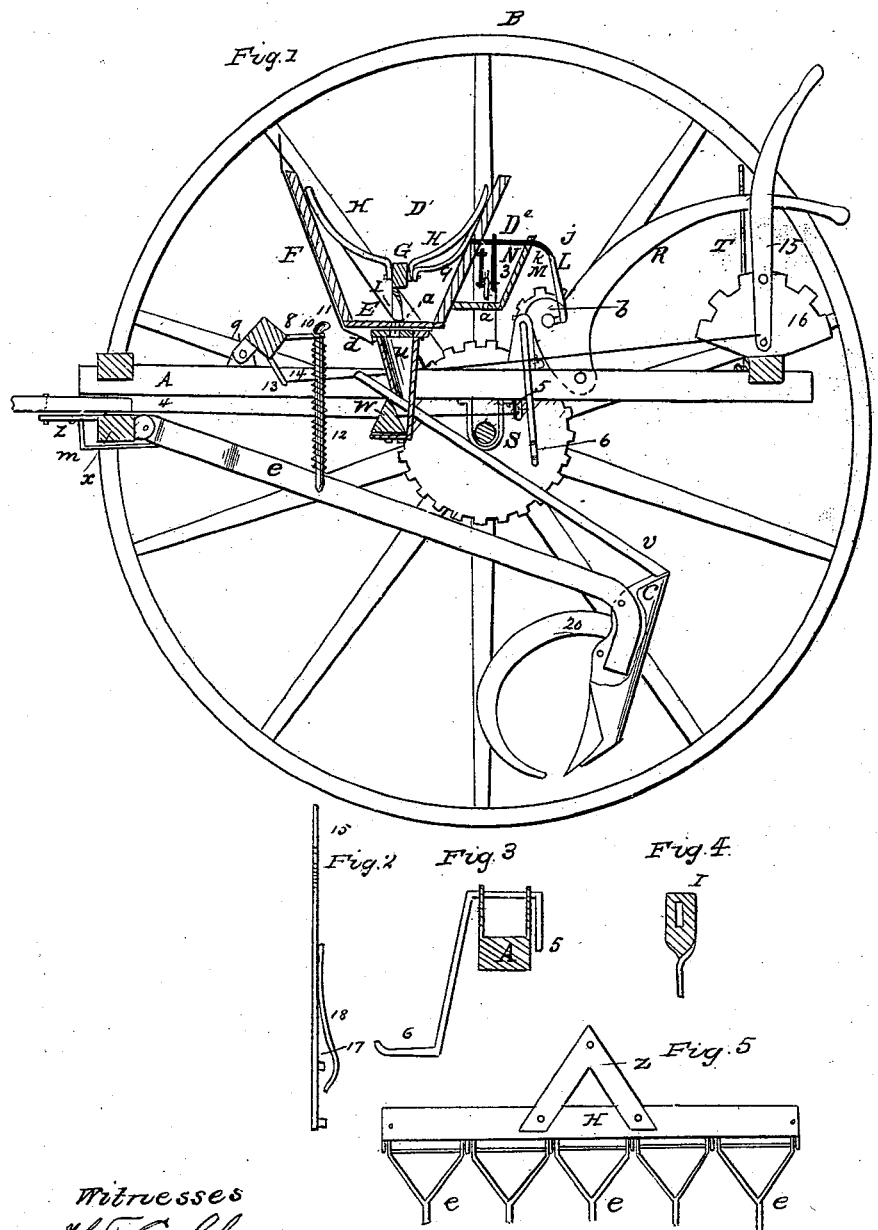
Witnesses
H. F. Colby
W. A. Stow
Inventor
Martin Hayden

United States Patent Office.

MARTIN HAYDEN, OF DOWAGIAC, MICHIGAN.

Letters Patent No. 100,033, dated February 22, 1870; antedated February 12, 1870.

IMPROVEMENT IN GRAIN-DRILLS.

The Schedule referred to in these Letters Patent and making part of the same.

*To all whom it may concern:*

Be it known that I, MARTIN HAYDEN, of Dowagiac, in the county of Cass, and State of Michigan, have invented a new and useful Improvement in Grain-Drills; and I do hereby declare that the following is a full, clear, and exact description of the construction and operation of the same, reference being had to the annexed drawings making a part of this specification, in which—

Figure 1 is a vertical section of the machine, and

Figures 2, 3, 4, and 5 are detached sections of the same.

The nature of my invention consists in constructing a more simple, durable, and convenient device for sowing grain in drills, being so constructed that greater perfection is attained in distributing grain, and the drill-teeth are so arranged as to be entirely under the control of the operator, who can guide them in line, though the team may accidentally or purposely be driven out of line.

In the accompanying drawings—

A represents a frame, which may be constructed in any suitable known form, and is provided with the carrying wheels B.

A transverse section of the hopper and seed-box is shown at $D^1$ and $D^2$. Said hopper and seed-box are attached to the frame A in the usual manner, (not shown in the drawings.)

E represents the bottom, provided with the openings $a\ a$ for each drill, which are adjustable longitudinally by means of the lever F, which actuates the slide-bar $d$.

A vibrating bar, G, is suspended in the hopper by means of the pendent arms H H, which are pivoted to the upper and inner side of the hopper, so as to allow the bar G to swing endwise.

I represents agitators, slotted to receive the screw by which they are attached to the bar G, making them adjustable vertically, by which means the distributing device is in part regulated.

$j$ represents a rock-shaft, passing through and supported by the sides of the hopper and seed-box, and provided with three arms, one of which is seen at $k$, and is attached to the crank-arm of the pinion M, by means of the connecting-rod L.

N is another arm of said rock-shaft, and is slotted at the lower end, to receive the pivot 3 in the vibrating bar $o$ of the seed-box $D^2$. Said bar is suspended by the pendent arms, P. A third arm of said rock-shaft, seen at $q$, is curved and slotted at the lower end, to receive a pivot attachment to the bar G.

The curved lever R has a foot-shaped end, the toe of which is pivoted to the frame A, while the heel carries the pinion M, which is thrown in and out of gear with the drive-wheel S by moving the lever R. Said lever is held in any desired position by means of a notched post, as seen at T, with which the handle of said lever engages by its natural tension, and is disengaged by springing the handle sidewise.

$u$ represents funnel-shaped spouts, attached to the hopper bottom, one side of which is elongated and slotted, to receive the pipe $v$, and is fastened at the lower end to the bar W. This bar serves as a support to the frame and a rest for the upper ends of the pipes $v$. These pipes have a portion of their upper surface cut away, to receive the grain from the spout $u$. The lower ends are pivoted to the hollow standards C.

An oscillating bar, $x$, is bolted to the under side of the rear end of the tongue $y$ at its center, by means of a crotched draft-plate, $z$, which prevents said bar from canting. Guard-irons, as seen at $m$, are attached to the under side of the frame A, for the purpose of supporting the ends of bar $x$.

To this bar are pivoted the forked draft-bars $e$, and to each end is attached an iron rod marked 4, connecting with the short arms of the bent foot-levers 5. The long arms of these levers form stirrups for the feet of the operator, marked 6, by means of which the bar $x$ is made to oscillate, causing a lateral movement of the drill-teeth.

Each end of the bar 8 is hinged to the frame A by means of the ears 9, attached to one corner. From the opposite corner project the slotted brackets 10, through which the suspension-rods 11 work. These rods are provided with hooks at the upper end, to prevent them from drawing down through the slots, and the lower ends are pivoted to the draft bar $e$, carrying the coiled springs 12. The object of these springs is to cause penetration of hard ground where the simple weight of the drill-tooth would be insufficient.

The lower corner of bar 8 is provided with the short arm 13, to the movable end of which is pivoted one end of the rod 14. The other end of said rod is pivoted to the curved lever 15. The lower end of this lever is pivoted to the center of the stationary circular rack 16.

A pin, marked 17, projects from one side of the lever 15, and engages with the teeth of said rack, and is held in position by the spring 18.

The forked draft-bars $e$ are bent edgewise at the rear end, forming strong elbows that require no bracing, the short arms of which drop into and are pivoted to the hollow standards C. The standard has several pivot holes, by means of which it can be set at different angles when desired.

Circular guards, marked 20, are attached to the standards C, and are made sharp in front, for the purpose of cutting through or drawing over any obstructions to the drill-teeth.

A driver's seat (not shown in the drawings) is attached to the rear part of the frame A, most convenient to the foot-levers 6. It will be seen that by moving the lever 15, the drill-teeth can be raised or lowered at will.

Having thus fully described my invention, any one skilled in the art can construct and operate it.

What I claim as new, and desire to secure by Letters Patent, is—

1. The rock-shaft $j$, having the arms K, N, and $q$, when arranged as set forth.

2. The slotted adjustable agitators I, with vibrating bar G, substantially as specified.

3. The hinged bar marked 8, having the slotted brackets 10, arm 13, rod 14, lever 15, and circular rack 16, when arranged as described.

4. The oscillating bar $x$, having the crotch-plate $z$, guard-irons $m$, draft-bars $e$, rods 4, and stirrups 6, attached as shown, for the purposes set forth.

5. The combination and arrangement of a grain-drill, combining the above-named parts with the frame A, the wheels B, drive-wheels $s$, pinion M, hopper $D^1$, seed-box $D^2$, vibrating bars G and O, curved lever R, post T, spout $u$, pipe $v$, lever F, pendent arms P and H H, bar W, tongue $y$, suspension-rods 11, springs 12 and 18, and standards O, the sharp curved guards, marked 20, all constructed and operated substantially as set forth.

In testimony whereof I have hereunto set my hand this 12th day of July, 1869.

MARTIN HAYDEN.

Witnesses:
  W. A. STOW,
  N. F. CHOATE.